US007937253B2

(12) United States Patent
Anast et al.

(10) Patent No.: US 7,937,253 B2
(45) Date of Patent: *May 3, 2011

(54) VIRTUAL PROTOTYPING SYSTEM AND METHOD

(75) Inventors: John Matthew Anast, Fairfield, OH (US); Douglass Scott Henry, West Chester, OH (US); Bruce William Lavash, West Chester, OH (US); Matthew Joseph Macura, Mariemont, OH (US); Noble Lester Rye, II, Liberty Twp, OH (US); Michael Lewis Rubin, Mason, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 1578 days.

This patent is subject to a terminal disclaimer.

(21) Appl. No.: 11/071,918

(22) Filed: Mar. 4, 2005

(65) Prior Publication Data
US 2005/0264572 A1  Dec. 1, 2005

Related U.S. Application Data

(60) Provisional application No. 60/550,490, filed on Mar. 5, 2004.

(51) Int. Cl.
*G06F 7/48* (2006.01)
*G06F 17/10* (2006.01)
(52) U.S. Cl. .............. 703/6; 703/2; 700/98; 345/474; 345/475
(58) Field of Classification Search .............. 703/1, 2, 703/6, 11; 700/97, 98, 132; 345/418–420, 345/473–475
See application file for complete search history.

(56) References Cited

U.S. PATENT DOCUMENTS

| 5,625,577 | A  | 4/1997 | Kunii |
| 6,310,619 | B1 | 10/2001 | Rice |
| 6,310,627 | B1 | 10/2001 | Sakaguchi |
| 6,377,856 | B1 | 4/2002 | Carson |

(Continued)

FOREIGN PATENT DOCUMENTS
EP    1 221 674 A2    7/2002
(Continued)

OTHER PUBLICATIONS
U.S. Appl. No. 11/071,916, filed Mar. 4, 2005, Anast.
(Continued)

*Primary Examiner* — Russell Frejd
(74) *Attorney, Agent, or Firm* — Megan C. Hymore; James E. Oehlenschlager; Roddy M. Bullock

(57) ABSTRACT

A computer method for simulating motion of at least a portion of a virtual body is disclosed. The method comprises the steps of: providing a surfaced body model; capturing or computing motion data for an external surface of the surfaced body; dividing the body model into at least two volumes, one of the volumes comprising at least a portion of the external surface of the surfaced body and being a deformable volume, and one of the volumes being a prescribed motion volume, the two volumes defining an interfacial surface; moving the external surface of the surfaced body according to the motion data while computing motion of the interfacial surface; and, simulating motion of the portion of a body by driving motion of the interfacial surface through the computed motion to provide an accurately positioned moving deformable surface that can be used in garment design.

5 Claims, 6 Drawing Sheets

U.S. PATENT DOCUMENTS

| | | | |
|---|---|---|---|
| 6,404,426 | B1 | 6/2002 | Weaver |
| 6,810,300 | B1* | 10/2004 | Woltman et al. .............. 700/132 |
| 6,907,310 | B2* | 6/2005 | Gardner et al. .............. 700/132 |
| 7,039,486 | B2* | 5/2006 | Wang ............................. 700/117 |
| 2001/0026272 | A1 | 10/2001 | Feld |
| 2003/0215130 | A1 | 11/2003 | Nakamura et al. |
| 2004/0236455 | A1 | 11/2004 | Woltman |
| 2004/0236456 | A1 | 11/2004 | Pieper |
| 2004/0236457 | A1 | 11/2004 | Stabelfeldt |
| 2005/0267613 | A1* | 12/2005 | Anast et al. .................... 700/98 |

FOREIGN PATENT DOCUMENTS

| | | |
|---|---|---|
| GB | 2 389 500 | 12/2003 |
| WO | WO 00/59581 A1 | 10/2000 |
| WO | WO 01/01235 A1 | 1/2001 |
| WO | WO 01/35342 A1 | 5/2001 |
| WO | WO 01/64106 A1 | 9/2001 |
| WO | WO 02/29758 A2 | 4/2002 |

OTHER PUBLICATIONS

U.S. Appl. No. 11/071,920, filed Mar. 4, 2005, Macura.
U.S. Appl. No. 11/072,047, filed Mar. 4, 2005, Lavash.
U.S. Appl. No. 11/071,917, filed Mar. 4, 2005, Anast.
U.S. Appl. No. 11/071,919, filed Mar. 4, 2005, Looney.
U.S. Appl. No. 11/072,152, filed Mar. 4, 2005, Macura.
David Baraff, Partitioned Dynamics, The Robotics Institute, Mar. 1997.
Fred S. Azar, A Deformable Finite Element Model of the Breast for Predicting Mechanical Deformations under External Perturbations, 2001.
C.W.J.Oomens, Deformation Analysis of a Supported Buttock Contact, BED-vol. 50, 2001.
Pascal Vollino, Versatile and Efficient Techniques for Simulating Cloth and Other Deformable Objects, Miralab 1998.
David E. Breen, Predicting the Drape of Woven Cloth Using Interacting Particles, ECRC-94-16.
Fabio Ganovelli, Indroducing Multiresolution Representation in Deformable Object Modeling.
Donald H. House, Towards Simulating Cloth Dynamics Using Interacting Particles, ECRC Feb. 7, 1996.
David E. Breen, A Particle-Based Model for Simulating the Draping Behavior of Woven Cloth, ECRC-94-19.
PCT International Search Report dated Nov. 11, 2005.
"A 3D Biomechanical Model for Numerical Simulation of Dynamic Mechanical Interactions of Bra and Breast During Wear", Sen'I Gakkaishi, vol. 59, No. 1, 2003, pp. 12-21.
Herda L. et al., "Skeleton-Based Motion Capture for Robust Reconstruction of Human Motion", Computer Animation 2000. Proceedings May 3-5, 2000, Piscataway, NJ, USA, IEEE, May 3, 2000, pp. 77-83, ISBN: 0-7695-0683-6.

* cited by examiner

VIRTUAL PROTOTYPING SYSTEM AND METHOD

CROSS REFERENCE TO RELATED APPLICATION

This application claims the benefit of U.S. Provisional Application No. 60/550,490, filed Mar. 5, 2004.

FIELD OF THE INVENTION

The present invention relates to three-dimensional computer-aided modeling and design of garments to be worn on a body.

BACKGROUND OF THE INVENTION

Computer simulations of motion, e.g., using FEA, have long been used to model and predict the behavior of systems, particularly dynamic systems. Such systems utilize mathematical formulations to calculate structural volumes under various conditions based on fundamental physical properties. Various methods are known to convert a known physical object into a grid, or mesh, for performing finite element analysis, and various methods are known for calculating interfacial properties, such as stress and strain, at the intersection of two or more modeled physical objects.

Use of computer simulations such as computer aided modeling in the field of garment fit analysis is known. Typically, the modeling involves creating a three-dimensional (hereinafter "3D") representation of the body, such as a woman, and a garment, such as a woman's dress, and virtually representing a state of the garment when the garment is actually put on the body. Such systems typically rely on geometry considerations, and do not take into account basic physical laws. One such system is shown in U.S. Pat. No. 6,310,627, issued to Sakaguchi on Oct. 30, 2001.

Another field in which 3D modeling of a human body is utilized is the field of medical device development. In such modeling systems, geometry generators and mesh generators can be used to form a virtual geometric model of an anatomical feature and a geometric model of a candidate medical device. Virtual manipulation of the modeled features can be output to stress/strain analyzers for evaluation. Such a system and method are disclosed in WO 02/29758, published Apr. 11, 2002 in the names of Whirley, et al.

Further, U.S. Pat. No. 6,310,619, issued to Rice on Oct. 30, 2001, discloses a three-dimensional, virtual reality, tissue specific model of a human or animal body which provides a high level of user-interactivity.

The problem remains, however, how to both capture motion of a deformable surface, and then drive motion of the same deformable surface and accurately measure its physical behavior, such as deformation in response to external forces. That is, to date there is no way to move a surface through a prescribed motion but also allow for deformations and deviations to that surface from that motion caused by external forces such as garments or other objects. There is no way to prescribe surface motion and compute the motion, including deformations of the same surface. The problem is complicated when two deformable surfaces are interacted, such as when a soft, deformable garment is in contact with soft, deformable skin.

Accordingly, there remains a need for a system or method capable of capturing motion of a deformable surface and modeling surface deformations of the deformable surface consistent with fundamental laws of physics.

Further, there remains a need for a system or method capable of modeling a soft, deformable garment while worn on a soft deformable body under dynamic conditions, such as walking or the act of sitting that simulates real stress/strain behavior.

Finally, there remains a need for a system or method capable of modeling a soft, deformable garment while worn on a soft deformable body under dynamic conditions that is not overly computer-time intensive; that is, it does not require such time and computing capability as to make it effectively un-usable for routine design tasks.

SUMMARY OF THE INVENTION

A computer method for simulating motion of at least a portion of a virtual body is disclosed. The method comprises the steps of:

provide a surfaced body model;

capturing or computing motion data for an external surface of the surfaced body;

dividing the body model into at least two volumes, one of the volumes comprising at least a portion of the external surface of the surfaced body and being a deformable volume, and one of the volumes being a prescribed motion volume, the two volumes defining an interfacial surface;

moving the external surface of the surfaced body according to the motion data while computing motion of the interfacial surface;

simulating motion of the portion of a body by driving motion of the interfacial surface through the computed motion.

DETAILED DESCRIPTION OF THE INVENTION

The method and system of the present invention can be used to drive surface motion of a surface, and in particular a deformable surface, with the accuracy of a motion capture technique while allowing the surface of the body to remain deformable. The surface deformations can be calculated as stresses and strains and, if desired, can be correlated to fit and comfort for modeling garments.

The virtual model of the present invention can be used to model the dynamic behavior of a body, such as a human body, body of an animal, or a body of other types of living organisms. In one embodiment, the dynamic behavior of the modeled body can be measured with respect to the body's interaction with garments. As used herein, the term "garments" means any article or object intended for placement on or in the body and intended for temporary wear. Therefore, the term garments includes externally-worn articles, such as clothing including hats, gloves, belts, shirts, pants, skirts, dresses, face masks, helmets, and the like. The term garments also includes internally-worn articles such as earplugs, hearing aids, mouth guards, and tampons. Internally-worn articles generally have externally-disposed access means for placement and removable, such as finger extensions on earplugs and strings on tampons. Some garments can be partially external and partially internal, such as earrings in pierced ears, hearing aids having externally-disposed portions, and interlabially-placed catamenial devices.

The method and system of the present invention can be used for designing garments intended for close body contact, such as shoes, gloves, brassieres and other intimate garments. In a preferred embodiment of the present invention a three-dimensional, virtual body is utilized to model the crotch region of a human woman and a sanitary napkin garment. The invention is not limited to such a person or garment, however, and it may be used for modeling the interaction of any garment/body interface, particularly under dynamic conditions. In the present invention, whether externally-worn, internally-worn, or a combination thereof, virtual modeling is used to simulate wear based on fundamental physical laws.

Figure 1:
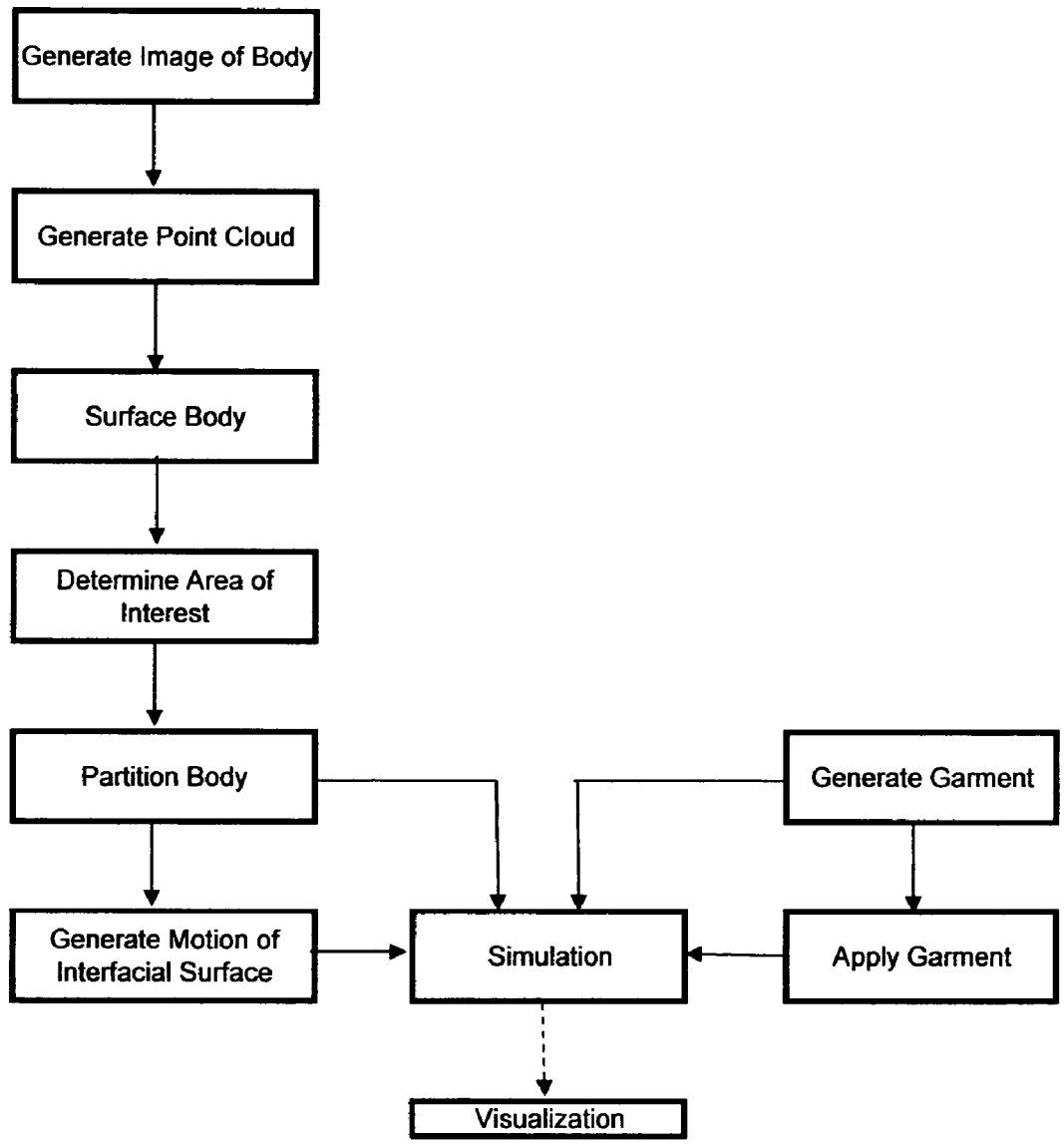
FIG. 1 is a flow chart depicting schematically one embodiment of the system of the present invention.

The invention can be understood by following the steps discussed below in conjunction with the flowchart in FIG. 1. Certain steps useful in garment fit analysis for the method of the invention are indicated by dashed lines in FIG. 1. The flowchart of FIG. 1 depicts elements associated with a preferred embodiment of the virtual model of the invention, starting with the step of generating an image of a body, or a portion of a body to be surfaced. Surfacing is a technique for rendering a computer generated three-dimensional (3D) image of an actual 3D object. In one embodiment the portion of the body to be surfaced is the waist region of a human, including the crotch area and pudendal region, of an adult female. In another embodiment, the waist region is the waist region of an infant, useful for modeling disposable diapers. If the model is to be used to model a garment, the surfaced portion of the body includes that which is to be modeled with a garment.

Surfacing of a body can be achieved by means known in the art, such as by imaging the external surface of a portion of a body by making a series of images of the desired portion of the body using surface digital imaging techniques. However, in a preferred embodiment, surfacing of portions of a human body can be achieved by imaging techniques that also capture internal portions, such as magnetic resonance imaging (MRI). Other techniques for obtaining suitable images for surfacing could be used, such as ultrasound imaging or x-ray imaging, but MRI scans have been found to be preferred in the present invention for imaging internal volumes and surfaces. However, due to body-positioning for MRI images that may distort the outer surface of the body, imaging outer surfaces can be made by other known techniques, such as silhouette capture and the like.

The resolution of the MRI images will determine the level of detail available for analysis of fit. Therefore, the MRI scan should have sufficient resolution, including a sufficient number of "slices," to capture anatomical features relevant to fit and comfort for the garment being modeled. The term "slices" is used in its ordinary sense with respect to MRI scans, and denotes the two-dimensional images produced by MRI imaging. In one embodiment, coronal slices of the waist region of an adult female were imaged with a 2 mm (1:1 scale) increment resolution using a GE Medical Systems Genesis Sigma 1.5 Echo Speed LX MRI unit. The data output can be a series of DICOM image files that can be exported for further evaluation and analysis. The DICOM image files can have multiple regions corresponding to various components or tissues of the body. For example, each slice of an MRI image may show regions of fat, skin, muscle, bone, internal organs, and the like. For the purposes of the preferred embodiment of a sanitary napkin, the regions of skin, fat and muscle in the pudendal region are of the most interest.

A point cloud representation can be made from the DICOM image files. On each slice of MRI images, the various regions, and the interface between regions can be located and designated by a series of points which can be identified and designated by either the software or manually by the user. The points so designated create a point cloud representation of each slice of MRI image. The number, concentration, and spacing of the points can be chosen to get sufficient resolution for the body portion being modeled, such as sufficient resolution to capture the undulations of tissues, e.g., the skin, in the various regions. In general, the number of points and their spacing should be such that relevant body portions are accurately represented to a sufficient resolution relevant to fit and comfort. In one embodiment, a distance of about 2 mm (1:1 scale) between points of the point cloud was found to provide sufficient resolution for analyzing fit and comfort of a garment worn on a body.

Figure 2:
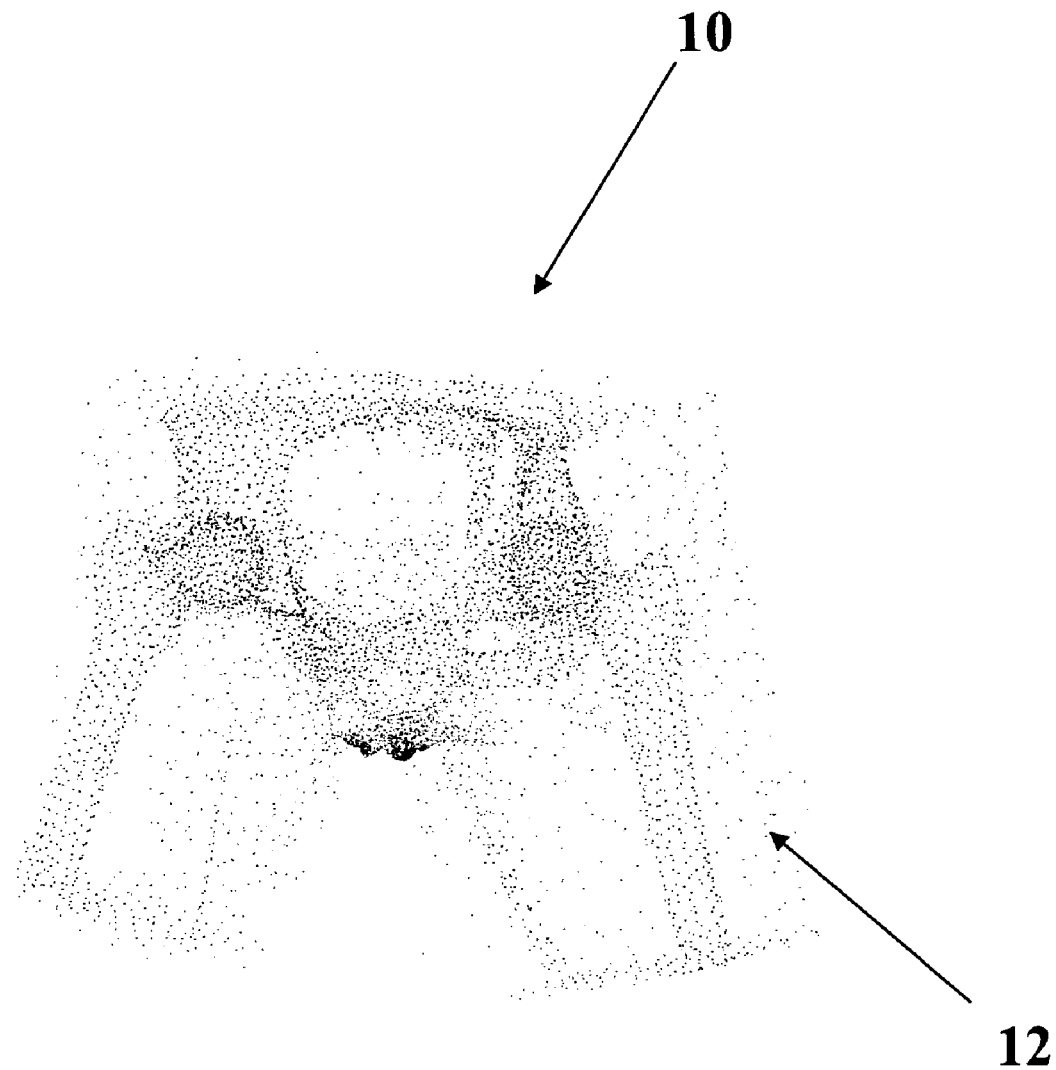
FIG. 2 is a depiction of a point cloud.

Once the points on each two-dimensional MRI slice are placed, software, such as SliceOmatic® available from Tomovision (Montreal, Canada), can generate a three-dimensional point cloud based on the relative position of the MRI slices. Once the three-dimensional point cloud is obtained, the data can be stored in electronic format in a variety of file types. For example, the point cloud can include a polygonal mesh in which the points are connected and the point cloud can be saved as a polygonal mesh file, such as a stereolithography file, that can be exported for further evaluation and analysis. An example of a visual rendering of a 3D point cloud 12 for the waist and crotch region 10 of a human female is shown in FIG. 2.

The point cloud of the body portion can then be surfaced by utilizing suitable software, including most computer aided design (CAD) software packages, such as, for example, Geomagic® available from Raindrop Geomagic (Research Triangle Park, N.C.). Surfacing can also be achieved by any of various means known in the art, including manually, if desired. In a preferred embodiment particular regions of the body can be surfaced, such as the interface between fat and muscle, fat and skin, and/or muscle and bone.

Alternatively, the MRI data can be surfaced through use of voxel approaches without first generating a point cloud.

Once the body portion of interest is surfaced, the specific body portion of interest to be modeled is determined. For example, when modeling sanitary napkin garments, the body portion surfaced may be the entire waist and crotch region of an adult female, while the body portion of interest to be modeled is the pudendal region. The body portion of interest to be modeled is the portion of the body in which deformations are to be considered for comfort and fit.

After determining the body portion of interest to be modeled, the surfaced portion can be arbitrarily partitioned into at least two volumes to isolate in one volume the body portion of interest to be modeled, i.e., portion of the body that is to remain deformable during modeling based on physics-based criteria. The remainder of the surfaced volume can simply be modeled by prescribed motion, thereby conserving resources in computing time. In a preferred embodiment, the surfaced body is partitioned into two separate, non-intersecting volumes, including at least a first deformable volume, and at least a second a prescribed motion volume. By "deformable volume" is meant a volume in which, when the simulation is performed, e.g., via finite element analysis (FEA), physical behavior, e.g., stress, deformation and motion, are computed. Conversely, by "prescribed motion volume" is meant a volume in which the deformations and motions are dictated by input to the simulation.

By "non-intersecting" with respect to the two volumes of the preferred embodiment is meant that the volumes do not overlap, i.e., no portion of the modeled body consists of both the deformable volume and the prescribed motion volume/surface, but the two volumes are distinctly partitioned. In one embodiment, only the deformable volume need be determined, and then, by definition, the remainder of the body portion to be modeled represents the prescribed motion volume/surface. The two volumes can share a common surface interface, which is all or a portion of their respective surfaces shared between the two volumes.

Figure 3:
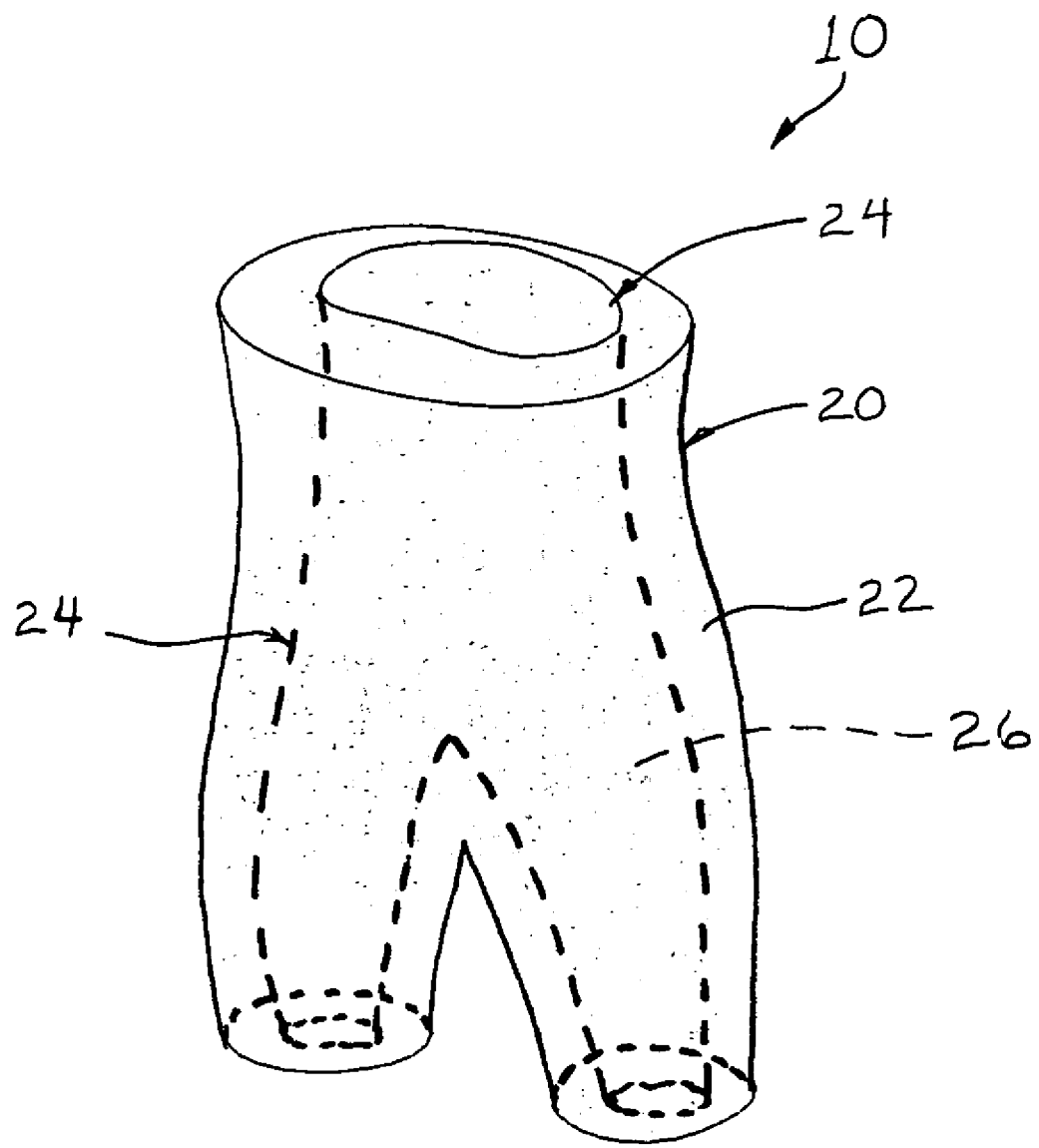
FIG. 3 is a schematic representation of two defined volumes.

As shown in FIG. 3, interfacial surface 24 can be fully interior to the surfaced body portion 12, i.e., a surface defined as being a certain distance "in," so to speak, from the external surface 20. The distance in can be termed the "surface normal distance, and should be great enough so as to allow for the external surface 20 to be deformable when modeled. As a guide to the surface normal distance required, the distance in can be 3× to 5× the greatest level of surface indentation expected. Further, the interfacial surface should be in sufficient proximity to the external surface so as to be capable of driving motion of at least a portion of the external surface. In the embodiment shown in FIG. 3, interfacial surface 24 defines prescribed motion volume 26 which is "inside" deformable volume 22 and forms no part of the external surface 20 except at the cross-sections of the body portion 12.

Figure 4:
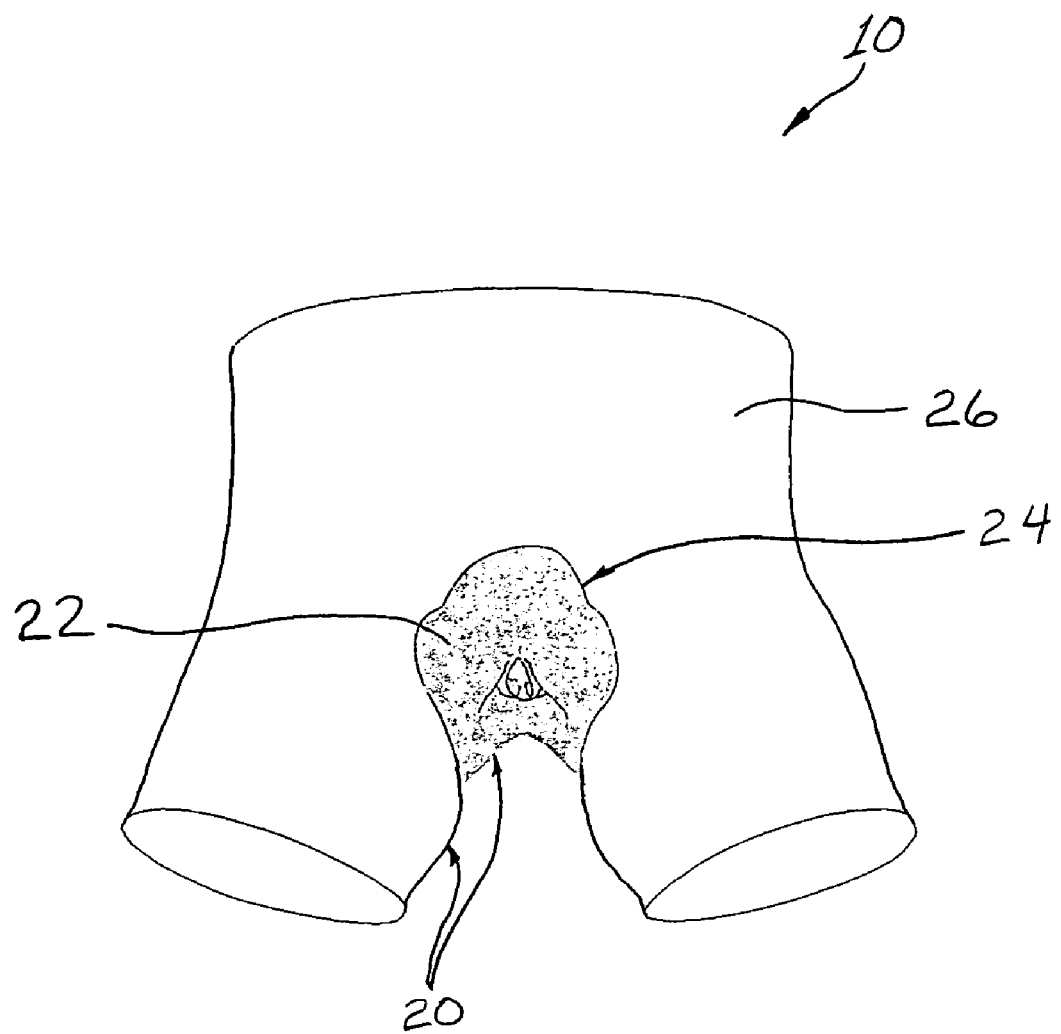
FIG. 4 is another schematic representation of two defined volumes.

As shown in FIG. 4, interfacial surface 24 can extend to and be partially bounded by a portion of the external surface 20. In FIG. 4, deformable volume 22 and prescribed motion volume 26 meet at interfacial surface 24 that extends to external surface 20. FIG. 4 shows two volumes that have been found to be useful for modeling feminine hygiene devices, such as sanitary napkins. As shown, a deformable volume 22 corresponds to the body portion of interest to be modeled, in this case the pudendal region of an adult female for evaluation of a sanitary napkin garment. Likewise, a prescribed motion volume 26 (or surface) corresponds to the portions of the body where the impact of a garment on the body is of lesser interest, but which may impact the analysis of fit and overall body movement.

After partitioning the body, the partitioned body can be meshed for modeling in a prescribed motion model as a prescribed motion volume. From the surfacing software, such as Geomagic®, the surfaces can be imported into software capable of rendering the surfaces in three dimensions, such as I-DEAS® available from UGSPLM Solutions, a subsidiary of Electronic Data Systems Corporation (Plano, Tex.), through an IGES file format, for example. Using I-DEAS®, the surfaces are used to generate 3D renderings defining corresponding separate components corresponding to the tissues in the portions of the body to be analyzed, for example the fat, muscle, and bone. To generate these 3D renderings, the technique of volume rendering from surfaces can be used as is commonly known in the art.

Figure 5:
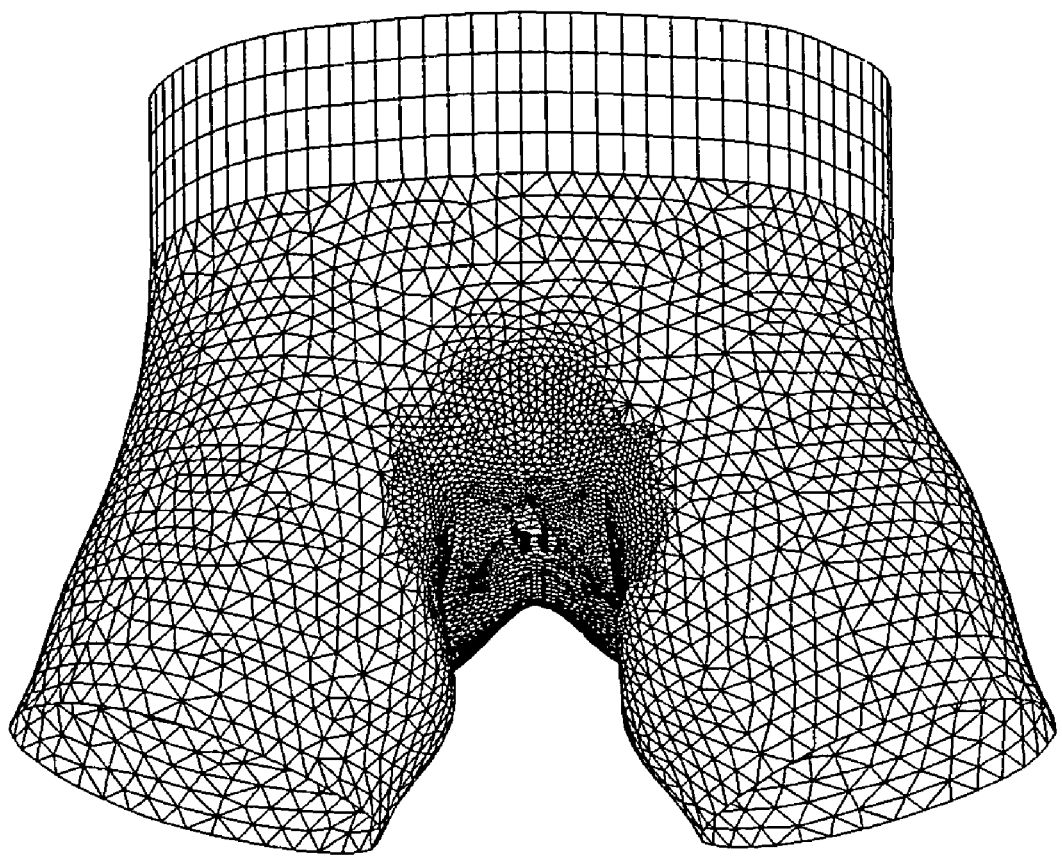
FIG. 5 is a meshed, three-dimensional model of a portion of a body.

The deformable volume can be meshed into a mesh of nodes and elements by means known in the art. For example, meshes can be created containing solid elements, shell elements, or beam elements, or combinations thereof. In the method of the present invention, the deformable volume is meshed as solid elements as shown in FIG. 5. Various tissues within the deformable volume, such as fat tissues, muscle tissues, and the like can be meshed into separate parts, and each part can have appropriate material properties assigned to it, while maintaining the continuity of the mesh. As shown in FIG. 5, portions of the deformable volume can be meshed with a greater density of nodes and elements.

The prescribed motion volume may be created from the meshed surface body as shell elements or solid elements. The prescribed motion volume need only be meshed sufficiently to enable realistic body modeling, in both static and dynamic conditions, to include transitions to adequate outer surface mesh density for contact modeling with garment.

To do motion simulation and/or fit modeling it is necessary that motion of the body portion being modeled be driven, i.e., moved through space in time. In the present invention, motion is driven by driving at least portions of an interfacial surface, as discussed below. The interfacial surface drives a deformable volume that is subject to physics-based constraints. Driving the interfacial surface in turn drives motion of the deformable volume that is free to move and deform, with the deformations producing measurable stress and strain. If used to model garments being worn, the measurable stress and strain can be due to contact with the garment being modeled. Moreover, a series of garments can be tested in sequence by using the same partitioned body portion, thereby enabling multiple garments to be relatively quickly tested for fit or comfort. Multiple layers of garments can be tested at the same time. For example a diaper can be covered in the back by fastening means such as tapes; a jersey can be worn over a sports bra; and a sanitary napkin can be worn in an undergarment.

The interfacial surface is driven along predetermined motion curves in space and time. The predetermined motion curves can be generated by use of external motion capture, as discussed more fully below. For example, various technologies, such as photography, digital imaging, stereo lithography, laser scans, and the like can be used to capture the motion of discrete identified points on the external surface of a body in motion. The motion capture means can capture the position of the identified points at discrete locations in space over time. For a given point, the number of instances of point capture in a given time, i.e., the frequency of capture, can be adjusted as desired to produce a series of curves in space for each point tracked on the moving body. The series of curves can be used to drive motion of the corresponding points on the mesh body to be analyzed for fit and motion. Other forms of motion capture include the use of fiber optic shape tape, magnetic field capture, and "flock of birds" techniques, and other known techniques for capturing motion using point of sight or hidden means.

To simulate motion for the prescribed motion model, a motion template can be captured or computed. In one embodiment, motion capture can be achieved through the use of processed video imaging. In such a process, multiple video images of an actual body portion of interest are recorded from multiple calibrated camera positions with respect to the body and processed to extract the shape of the body, a technique which is itself known in the art. The shape of the video-imaged body can be created by means known in the art, such as by voxel carving to produce a point cloud, by shape from silhouette to produce a surface, and the like. Additionally, using photogrammetry, features in the processed video imagery can be used for measurements. Such measurements include strain measurements on skin or garments which can be incorporated into the motion template.

In one embodiment Maya® software available from Alias (Toronto, Canada) or the like can be used. By use of Maya®, for example, the representative body shape, be it a point cloud or surface shape, can be recorded for each step of interest in time. Once all the body shapes are recorded for each increment of time, the shapes together are a motion template representing body motion, but this template is not suitable for FEA analysis because it is not based upon meshed nodes having known locations and parameters.

The motion model useful for analysis by FEA techniques is made by fitting, as the term is used in the art, the prescribed motion model to the motion template(s). In one embodiment, the fitting can be accomplished by use of the following steps. First, the prescribed motion model is skinned, as the term is used in the art, to get a poseable model. Skinning is a technique that is itself known in the art and can be achieved by use of software such as the aforementioned Maya® software. For example, Maya® permits the creation of a joint segment skeleton that can be placed inside the prescribed motion model, and thereafter skin the model.

Next, the poseable model is aligned to one of the motion templates captured or computed above. This step is repeated for each of the motion templates representing changing poses through time. This is referred to as a "first fit." As a "second fit" the surfaced body is deformed to match the motion template for each of the templates of interest. Then software such as Maya® can interpolate motion at each time frame. Maya® can save the data as an animation, but does not have the capability to translate the data into data useful for FEA analysis. Therefore, this data can be exported for motion analysis by FEA techniques.

For FEA analysis, the motion curves created in Maya® can be exported to generate displacement curves to create time vs. 3D displacement curves for every node of interest. This series of curves (i.e., three curves (x, y, z) for each node) can be saved as a text file for further analysis. Further, contact properties, such as coefficients of friction, can be inputted to govern the physics between the separate volumes and/or the external surface.

With the nodal displacements on the external surface known, this information can be used within ABAQUS®, available form Abaqus, Inc., Pawtucket R.I., to directly move the external body surface by using nodal displacements commands for each node for which a displacement curve has been generated. Using ABAQUS®, as the external, visible surface being driven, the motion of all nodes on the meshed body are known. Within ABAQUS®, the displacement of all nodes are computed using a physics-based calculation in which nodal displacements for a fixed pre-defined displacement are dependent primarily upon the fundamental material model of the body.

While the external surface mesh is driven, the motion of the interfacial surface is recorded. This information is recorded in the form of nodal displacements for at least a portion of the interfacial surface and is saved as interfacial surface motion curves (i.e., "boundary conditions" and "amplitude" in the terminology of ABAQUS).

The prescribed nodal displacement on the external surface of the deformable volume can then be removed and replaced with a prescribed nodal displacement of the interfacial surface motion curves. The interfacial surface motion curves can then used to drive the motion of the modeled body, including external surface portions that may be part of the prescribed motion volume. Driving the interfacial surface, therefore achieves simulated motion of the body portion being modeled.

The benefit of being able to drive the volume interface in conjunction with the external, visible surface of the non-deformable volume is that it allows for accurate representation of realistic motion while enabling a portion of the external surface of the body to be deformable without any prescribed motions defining how that portion will deform.

Additionally, this permits the number of nodes and elements required to be minimized and yet still accurately and efficiently analyze a portion of a moving body. This results in minimizing the cost and computing time necessary for analysis.

If desired, the virtual body (or body portion) can be modeled with a garment or multiple garments, for example, to simulate fit and/or comfort. The garment to be evaluated by the method of the present invention can be generated by producing a computer aided design (CAD) geometry of the actual garment of interest. CAD geometries can be produced from CAD drawings, as is known in the art. Once the CAD geometry is produced, it can be meshed into a mesh of nodes and elements by means known in the art. The number of nodes and elements can be varied as necessary or desired for adequate garment modeling. Further contact properties, such as coefficients of friction between the body parts or between the body and the garment, can be inputted to govern the physics between the separate volumes and/or the external surface.

Figure 6:
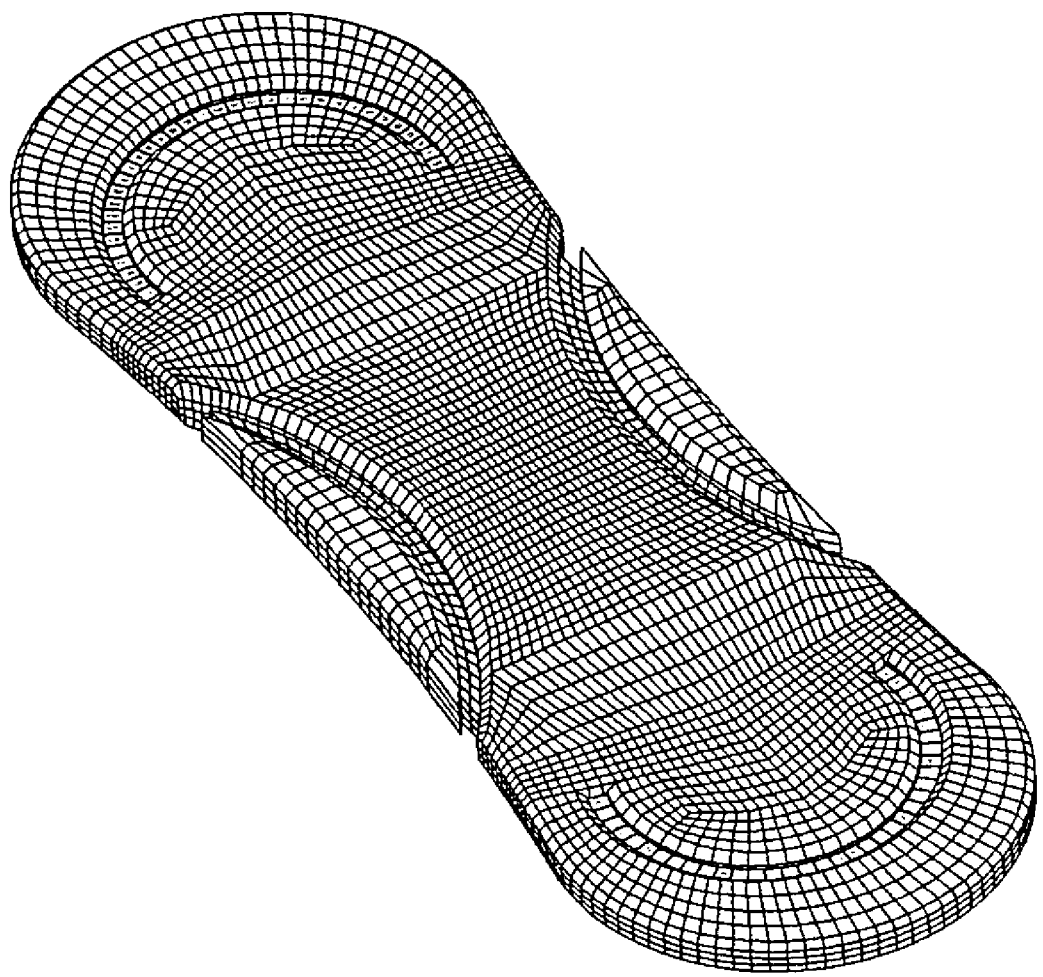
FIG. 6 is a meshed, three-dimensional model of a garment to be virtually prototyped by the system and method of the present invention.

In one embodiment, the garment is a sanitary napkin intended to be worn against the body of an adult woman as shown in FIG. 6, which shows a meshed sanitary napkin garment. In most cases the sanitary napkin is worn inside the undergarment, such as elasticized panties. Therefore, in one embodiment of the present invention, the garment can actually be a garment system comprised of two or more garments interacting during wear. For example, certain sports equipment, such as shoulder pads and jerseys can be analyzed for fit and comfort as a multiple garment system. Likewise, the interaction between shoes and socks can be analyzed.

The garment can be comprised of more than one structural component, and each component can be created as a separate part and meshed independently. This enables individual material properties to be assigned to each component. For example, a woman's undergarment can have at least three components: the overall panty fabric, the crotch fabric, and the elastic strands. Each of these components can be created as separate parts with individualized material properties appropriate for each material. The material properties can be revised by the user as necessary for different garments.

The garment can be modeled in various initial states, such as in a relaxed, undeformed state, or in a non-relaxed or deformed state. For example, a sanitary napkin can be initially modeled in a generally flat, undeformed initial state, as shown in FIG. 6, or it can be initially modeled in a bunched, folded state. In one embodiment, a garment is initially modeled by having the fewest number of components initially deformed. For example, sanitary napkin can be modeled in a flat-out, undeformed configuration.

Predetermined fixed points on the meshed garment, or garment system, can be identified, the fixed points being fixed in space or with respect to the meshed body during fit analysis according to the present invention. In general, the fixed points can be a maximum distance from the deformable volume of the meshed body.

The fixed points aid in the garment being "applied" to the meshed body by using motion curves to prescribe motion to the fixed points such that the fixed points are translated from a first initial modeled position to a second fixed position relative to the meshed body. To simulate fit and comfort of the garment and body, respectively, the garment or garment system is first "applied" as described above. At this point, the simulation can calculate stresses and strains associated with fit prior to body motion. By driving motion of the body through the predetermined motion curves of the interfacial surface, dynamic stress-strain calculations on the deformable volume and garment or garment system can be made and correlated with dynamic fit and comfort.

Fit and comfort analysis can be achieved by use of a dynamic stress-strain analyzer, such as, for example, LS-DYNA® (Livermore Software Technology Corporation, Livermore, Calif.), ABAQUS® (ABAQUS Inc., Pawtucket, R.I.), or, ANSYS® (ANSYS Inc., Canonsburg, Pa.). Any desired inputs, such as body mesh motion, garment mesh motion, contact surfaces, garment mesh, and/or body mesh can be inputted to accomplish the analysis. The stress-strain analyzer supplies an output of deformed motion and corresponding forces, such as stress and strain. The forces include forces associated with deforming both the body and the garment. Garment deformation and the magnitude of the forces required to generate the deformation can be correlated to fit and comfort.

Optionally, the simulation output, such as deformations and forces can also be visualized using software such as LS-PREPOST® (Livermore Software Technology Corporation, Livermore, Calif.), Hyperview® (Altair Engineering, Troy, Mich.), Ensight® (Computational Engineering International, Apex, N.C.), or ABAQUS VIEWER® (ABAQUS Inc., Pawtucket, R.I.), for example. Visualization of the garment as the body portion is manipulated can show in visual representation the deformation of the garment. For example, a sanitary napkin can undergo buckling, twisting, and bunching during wear. Such deformation is difficult, if not impossible, to watch in real time on a real person due to the practical constraints of such a system. However, such pad fit characteristics can be easily visualized and manipulated in the computer simulation. This capability significantly reduces the time and expense of designing better fitting garments such as sanitary napkins. Properties of materials can be changed as desired and inputted through the dynamic stress-strain analyzer to change the characteristics of the garment, thereby providing for virtual prototyping of various designs.

All documents cited in the Detailed Description of the Invention are, are, in relevant part, incorporated herein by reference; the citation of any document is not to be construed as an admission that it is prior art with respect to the present invention.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A computer method for simulating motion of at least a portion of a virtual body, said method comprising the steps of:
   a. providing a surfaced body model of at least the pudendal region of an actual model;
   b. capturing motion data for an external surface of said actual body;
   c. dividing the body model into at least two volumes, one of said volumes comprising at least a portion of the external surface of said surfaced body and being a deformable volume, and one of the volumes being a prescribed motion volume, said two volumes defining an interfacial surface;
   d. moving the external surface of said surfaced body according to said motion data while computing motion of the interfacial surface; and
   e. simulating motion of a portion of a body by driving motion of the interfacial surface through the computed motion.

2. The computer method of claim 1, wherein the virtual body is a deformable virtual body.

3. The computer method of claim 1, wherein moving the external surface of said surfaced body according to said motion data while computing motion of the interfacial surface is performed with software that can save the data as an animation.

4. The computer method of claim 1, further comprising the steps of:
   f. providing a meshed garment model;
   g. applying said garment model to said portion of a body; and
   h. simulating physical deformation of at least a portion of a garment while driving motion of said interfacial surface.

5. The computer method of claim 1, further comprising the step of:
   i. analyzing stress and strain while the interfacial surface is driven in a prescribed motion.

* * * * *